United States Patent
Quiros Perez et al.

(10) Patent No.: US 10,829,162 B2
(45) Date of Patent: Nov. 10, 2020

(54) VEHICLE HAVING FLOOR ASSEMBLY

(71) Applicants: Flor Elena Quiros Perez, Macomb, MI (US); Edgar Ceballos, Rochester, MI (US); Maurice J Gisler, Rochester Hills, MI (US); John H Pray, Shelby Township, MI (US); Uzziel Ramirez, Rochester, MI (US); Jacob Wright, Rochester Hills, MI (US)

(72) Inventors: Flor Elena Quiros Perez, Macomb, MI (US); Edgar Ceballos, Rochester, MI (US); Maurice J Gisler, Rochester Hills, MI (US); John H Pray, Shelby Township, MI (US); Uzziel Ramirez, Rochester, MI (US); Jacob Wright, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/128,593

(22) Filed: Sep. 12, 2018

(65) Prior Publication Data
US 2020/0079436 A1 Mar. 12, 2020

(51) Int. Cl.
*B62D 27/06* (2006.01)
*B62D 25/20* (2006.01)

(52) U.S. Cl.
CPC ............. *B62D 25/20* (2013.01); *B62D 27/06* (2013.01)

(58) Field of Classification Search
CPC ............... B62D 25/20; B62D 25/2027; B62D 25/2036; B62D 25/2009; B62D 25/2018; B62D 21/02; B62D 25/087
USPC ... 296/193.07, 187.08, 193.08, 29, 75, 1.08, 296/64, 24.33; 29/897.2, 428, 458, 525, 29/525.02, 525.11; 428/99, 116, 158, 428/172, 201, 209, 34.1, 457, 61
See application file for complete search history.

(56) References Cited

U.S. PATENT DOCUMENTS

| | | | | |
|---|---|---|---|---|
| 5,257,846 A * | 11/1993 | Kanai | ...................... | B60R 5/04 16/359 |
| 5,288,121 A | 2/1994 | Graves | | |
| 6,669,260 B2 | 12/2003 | Clark et al. | | |
| 6,695,380 B1 | 2/2004 | Hicks | | |
| 6,955,387 B2 * | 10/2005 | Mills | ......................... | B60R 5/04 296/39.1 |
| 2011/0101721 A1 * | 5/2011 | Sogame | .................. | B60R 5/045 296/37.1 |
| 2014/0145470 A1 * | 5/2014 | Preisler | .................. | B62D 29/04 296/193.07 |
| 2016/0096479 A1 * | 4/2016 | Nedelman | ............... | B60R 5/045 296/24.4 |
| 2017/0036609 A1 * | 2/2017 | Huebner | .................. | B60R 5/045 |
| 2017/0247062 A1 * | 8/2017 | Vu | ..................... | B62D 33/0273 |

* cited by examiner

*Primary Examiner* — D Glenn Dayoan
*Assistant Examiner* — Sunsurraye Westbrook
(74) *Attorney, Agent, or Firm* — Ralph E Smith (57) ABSTRACT

A vehicle includes a cargo area having a surface and a floor assembly. The floor assembly includes a pair of elongated trim panels, a floor panel and a pair of locking mechanisms. The pair of elongated trim panels are mounted to the surface of the cargo area at opposite sides thereof. The floor panel is slidably disposed onto the surface of the cargo area and between the pair of trim panels. The pair of locking mechanisms connect the floor panel and the pair of trim panels to prevent vertical and horizontal movement of the floor panel when the floor panel is fully disposed onto the surface of the cargo area.

14 Claims, 7 Drawing Sheets

VEHICLE HAVING FLOOR ASSEMBLY

FIELD

The present disclosure relates to a vehicle having a floor assembly.

BACKGROUND

This section provides background information related to the present disclosure and is not necessarily prior art.

Some vehicles include a load floor that is disposed over a storage compartment within a vehicle cargo area. The load floor provides selective access to the storage compartment within the vehicle cargo area. The load floor can be difficult to remove and inadequate for retaining items (e.g., a spare tire) in the storage compartment of the vehicle cargo area. The present disclosure provides a floor assembly that is convenient to remove and is adequate for retaining items in the storage compartment of the vehicle cargo area.

SUMMARY

This section provides a general summary of the disclosure, and is not a comprehensive disclosure of its full scope or all its features.

In one form, the present disclosure provides a vehicle that includes a cargo area having a surface and a floor assembly. The floor assembly includes a pair of elongated trim panels, a floor panel and a pair of locking mechanisms. The pair of elongated trim panels are mounted to and extend along the surface of the cargo area at opposite sides thereof. The floor panel is slidably disposed onto the surface of the cargo area and between the pair of trim panels. The pair of locking mechanisms connecting the floor panel and the pair of trim panels to prevent vertical and horizontal movement of the floor panel when the floor panel is fully disposed onto the surface of the cargo area.

In some configurations of the vehicle of the above paragraph, each locking mechanism includes a trim-panel locking member and a floor-panel locking member. The trim-panel member is attached to a respective trim panel and the floor-panel locking member is attached to a periphery of the floor panel.

In some configurations of the vehicle of any one or more of the above paragraphs, the trim-panel locking member and the floor-panel locking member cooperate to prevent vertical and horizontal movement of the floor panel when the floor panel is fully disposed onto the surface of the cargo area.

In some configurations of the vehicle of any one or more of the above paragraphs, the surface of the cargo area defines a storage compartment.

In some configurations of the vehicle of any one or more of the above paragraphs, the floor panel includes a locking-member section and a handle section. The locking-member section is rotatably attached to the handle section.

In some configurations of the vehicle of any one or more of the above paragraphs, the handle section of the floor panel covers the storage compartment when the floor panel is fully disposed onto the surface of the cargo area.

In some configurations of the vehicle of any one or more of the above paragraphs, the floor-panel locking member is attached to the locking-member section of the floor panel.

In some configurations of the vehicle of any one or more of the above paragraphs, the floor-panel locking member includes a body and at least one spring element, and wherein the at least one spring element is cantilevered to the body.

In some configurations of the vehicle of any one or more of the above paragraphs, a protrusion extends from a distal end of the at least one spring element.

In some configurations of the vehicle of any one or more of the above paragraphs, the trim-panel locking member includes a body and a flange. The flange extends from a periphery of the body toward the surface of the cargo area.

In some configurations of the vehicle of any one or more of the above paragraphs, the body of the trim-panel locking member includes at least one slot formed therein.

In some configurations of the vehicle of any one or more of the above paragraphs, the protrusion extending from the distal end of the at least one spring element is received in the at least one slot formed in the body of the trim-panel locking member when the floor panel is fully disposed onto the surface of the cargo area.

In some configurations of the vehicle of any one or more of the above paragraphs, the body of the floor-panel locking member contacts the flange of the trim-panel locking member to restrict horizontal movement of the floor panel when the floor panel is fully disposed onto the surface of the cargo area.

In some configurations of the vehicle of any one or more of the above paragraphs, the body of floor-panel locking member contacts the body of the trim-panel locking member to restrict vertical movement of the floor panel when the floor panel is fully disposed onto the surface of the cargo area.

In some configurations of the vehicle of any one or more of the above paragraphs, a gate rotatable between a closed position and an open position. The gate restricts vertical and horizontal movement of the floor panel when in the closed position.

In some configurations of the vehicle of any one or more of the above paragraphs, the floor-panel locking member slides under the trim-panel locking member when the floor panel is slidably disposed onto the surface of the cargo area.

In some configurations of the vehicle of any one or more of the above paragraphs, the handle section is allowed to move in the vertical direction when the gate is in the open position and is restricted from moving in the vertical direction when the gate is in the closed position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

The drawings described herein are for illustrative purposes only of selected embodiments and not of all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
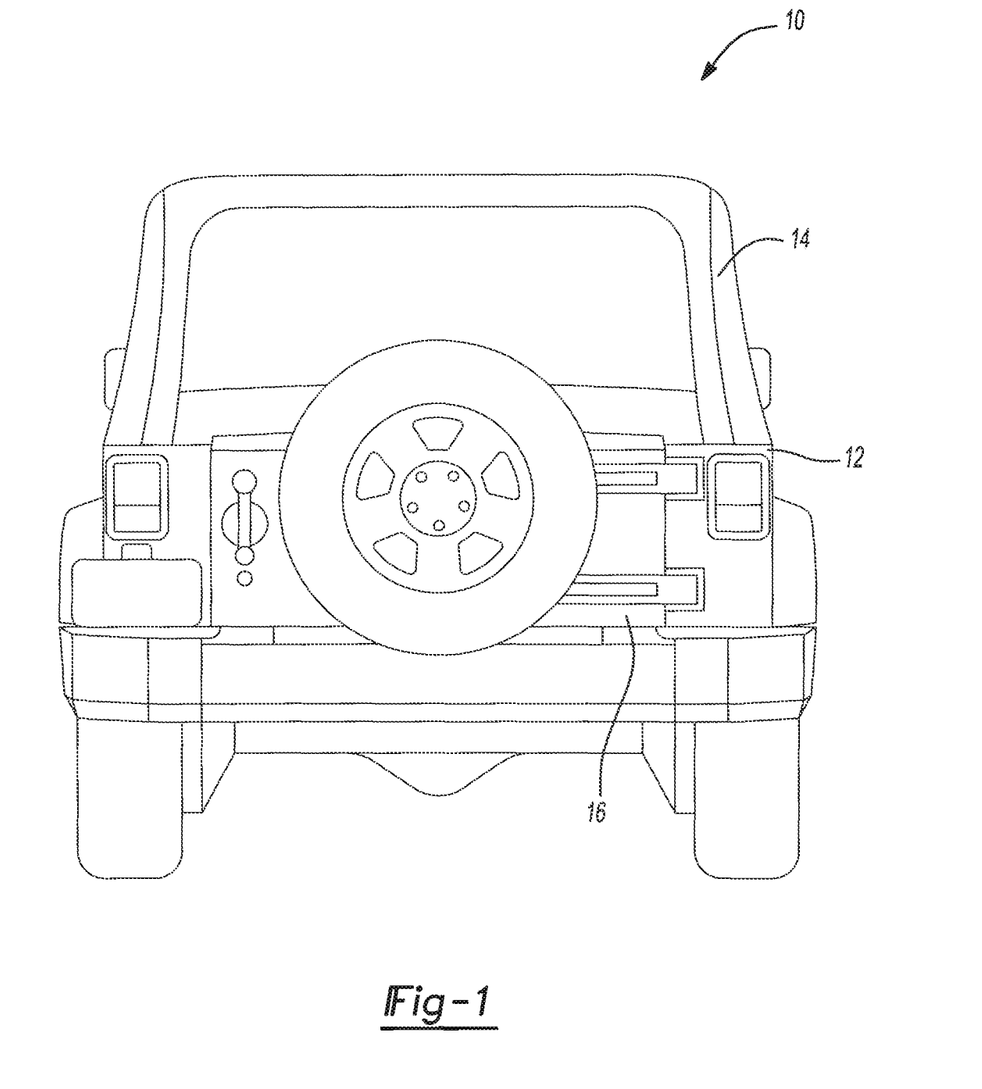
FIG. 1 is a back view of a vehicle having a floor assembly according to the principles of the present disclosure.
Figure 2:
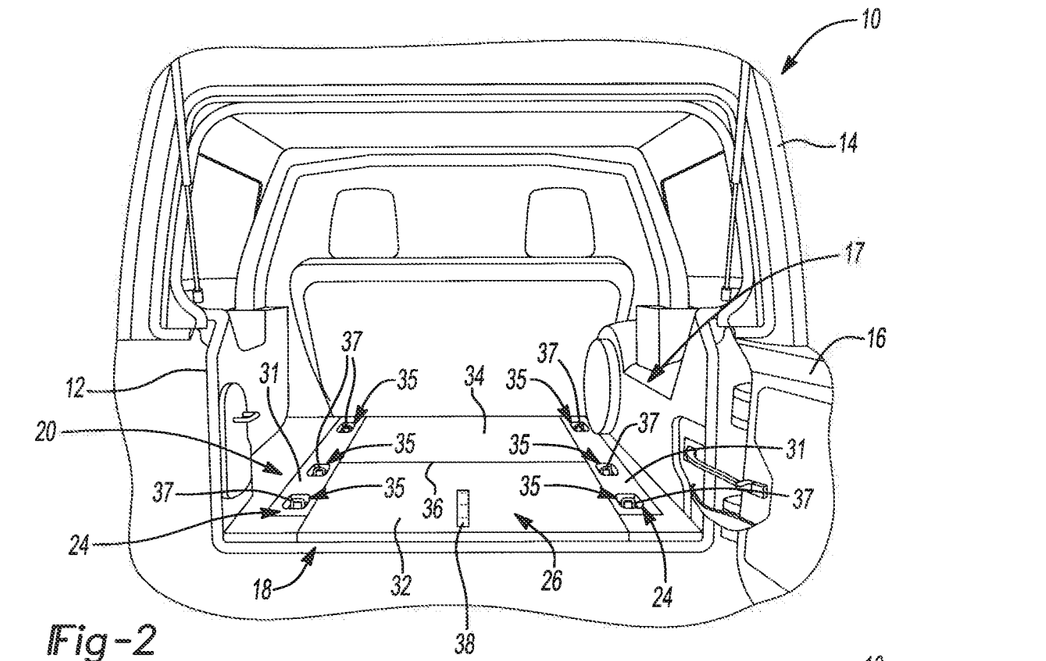
FIG. 2 is a back view of a portion of the vehicle of FIG. 1 with the floor assembly disposed therein.
Figure 3:
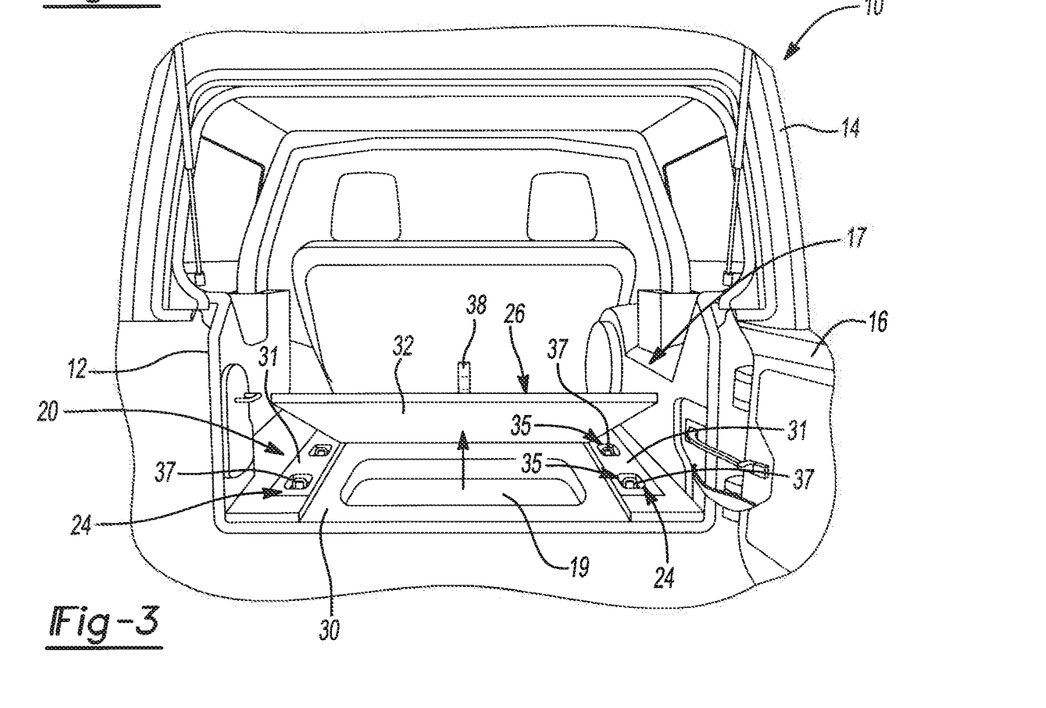
FIG. 3 is back view of a portion of the vehicle of FIG. 1 with a load floor of the floor assembly rotated.
Figure 4:
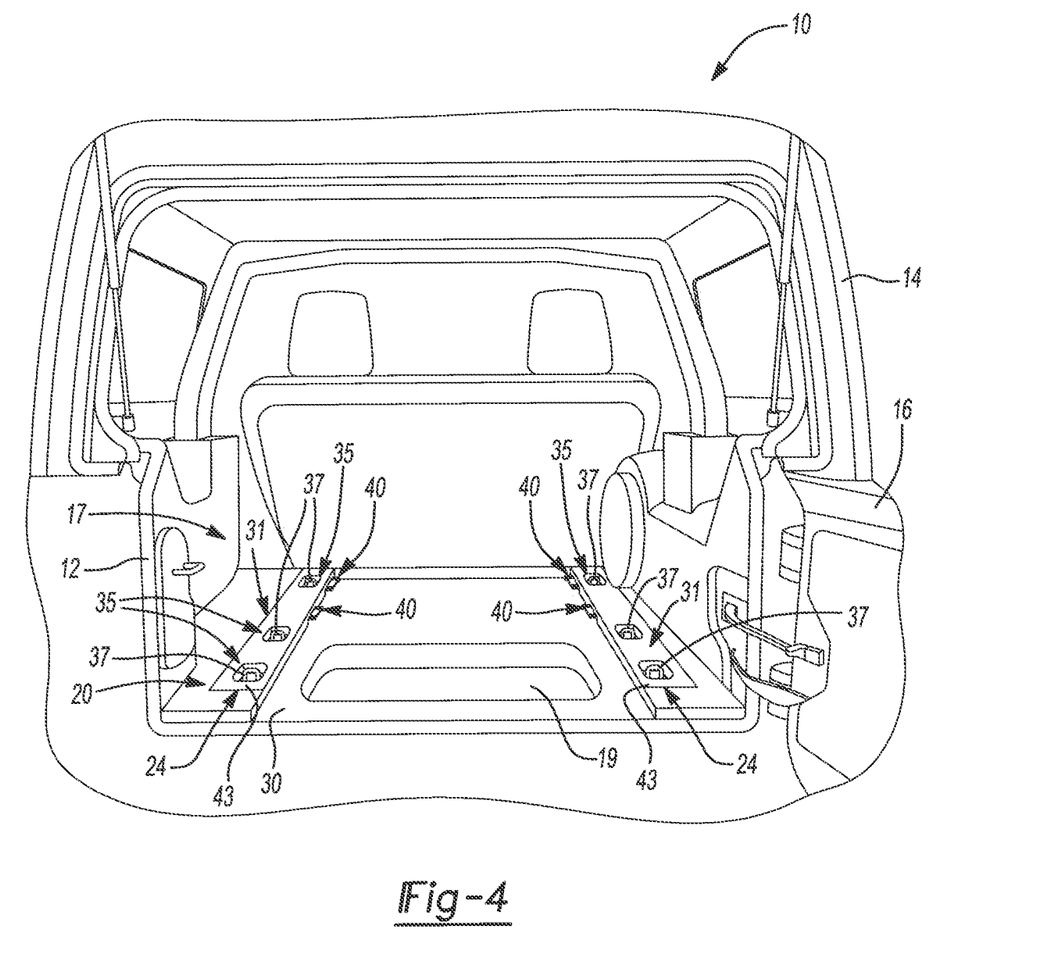
FIG. 4 is a back view of a portion of the vehicle of FIG. 1 with the load floor removed.

As shown in FIGS. 1-4, a vehicle 10 is provided. The vehicle 10 includes a vehicle body 12, a vehicle roof cover 14 and a gate 16. As shown in FIGS. 2-4, the vehicle body 12 includes a cargo area 17 at a rear end thereof (i.e., behind an occupancy compartment). The cargo area 17 includes a floor assembly 18 that covers a storage compartment 19. The vehicle roof cover 14 is removably attached to the vehicle body 12. The gate 16 is rotatably attached to the vehicle body 12 between a closed position (FIG. 1) in which the cargo area 17 is enclosed and an open position (FIGS. 2-4) in which the vehicle body 12 defines an opening 20 to the cargo area 17. As will be described in more detail below, the floor assembly 18 provides selective access to the storage compartment 19.

Figure 5:
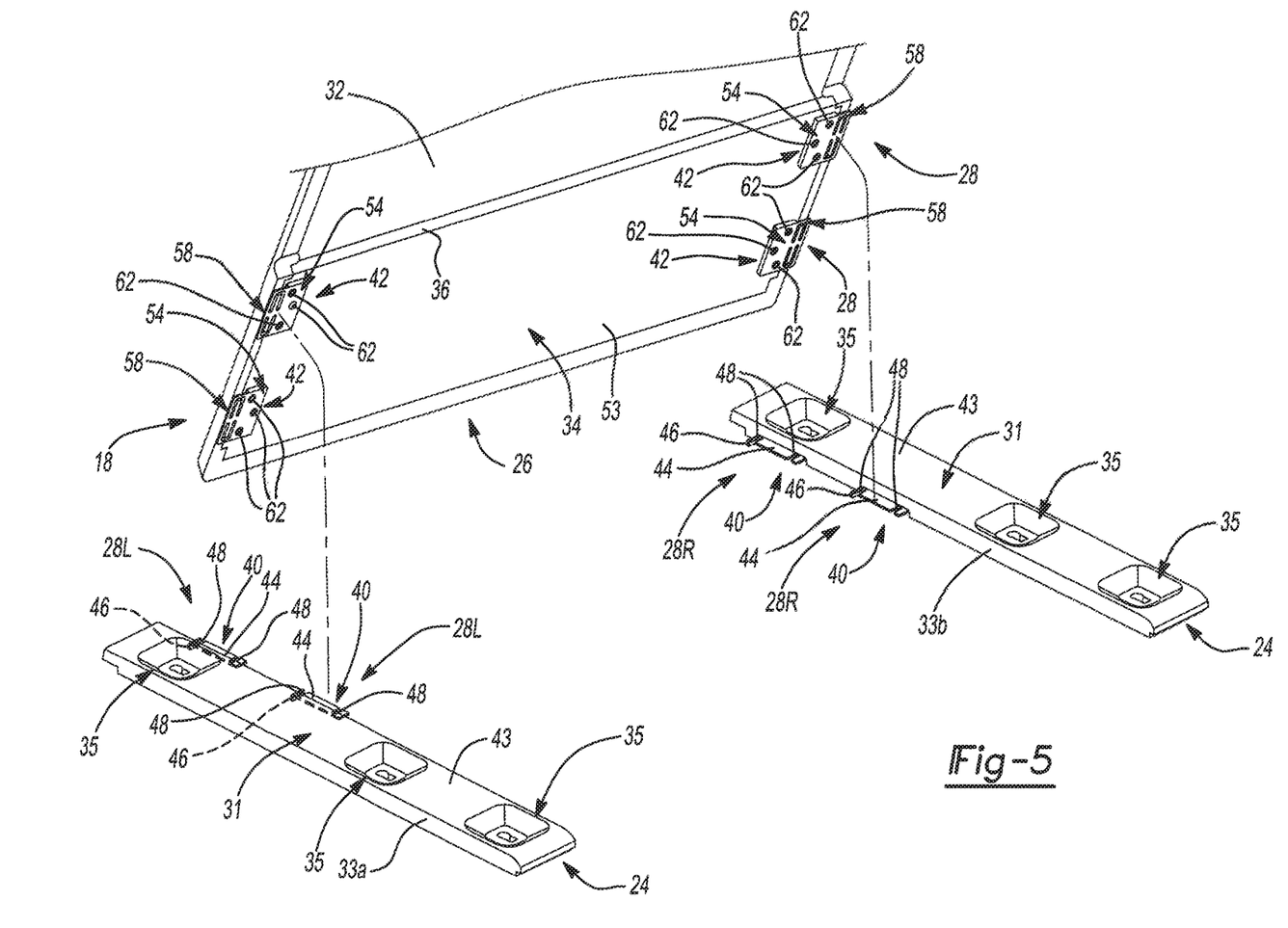
FIG. 5 is a partial perspective view of the floor assembly.

With reference to FIGS. 1-5, the floor assembly 18 includes a pair of elongated trim panels 24, a floor panel or load floor 26 (FIGS. 2, 3 and 5) and pairs of locking mechanisms 28 (FIG. 5). The pair of trim panels 24 are made of a metallic or polymeric material. The pair of trim panels 24 are mounted to and extend along a surface 30 of the cargo area 17 at opposing sides thereof. Each trim panel 24 includes a main body 31 and outside and inside sides 33a, 33b that extend perpendicularly from respective ends of the main body 31. The main body 31 includes a plurality of attachment sections 35 disposed at various locations of the main body 31. Tie-down rings 37 are mounted to the surface 30 of the cargo area 17 and extend from the surface 30 through the attachment sections 35. Tie-down straps (not shown) can extend over items (not shown), for example, disposed in the cargo area 17 and can be tied to the tie-down rings 37. In this way, the items in the cargo area 17 can be tied down to prevent movement thereof.

Figure 9:
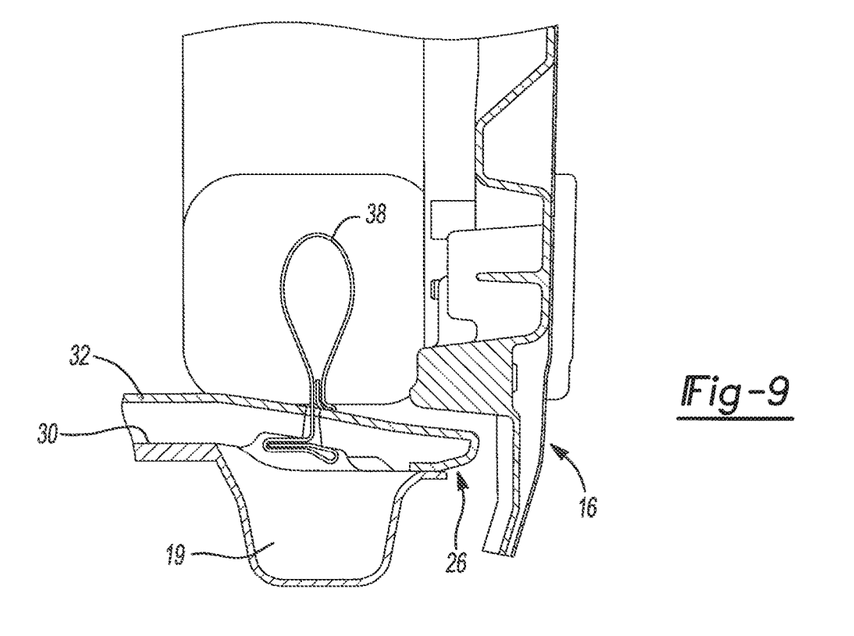
FIG. 9 is a cross-sectional view of a gate of the vehicle of FIG. 1 in a closed position.

The floor panel 26 is slidably disposed onto the surface 30 of the cargo area 17 and between the pair of trim panels 24. The floor panel 26 includes a rectangular-shaped handle section 32 and a rectangular-shaped locking-member section 34 that are rotatably attached to one another via a hinge 36. As shown in FIGS. 2, 3 and 9, a handle 38 is securely attached at or near an end of the section 32 of the floor panel 26 such that a user (not shown) can rotate the section 32 relative to the section 34.

Figure 7:
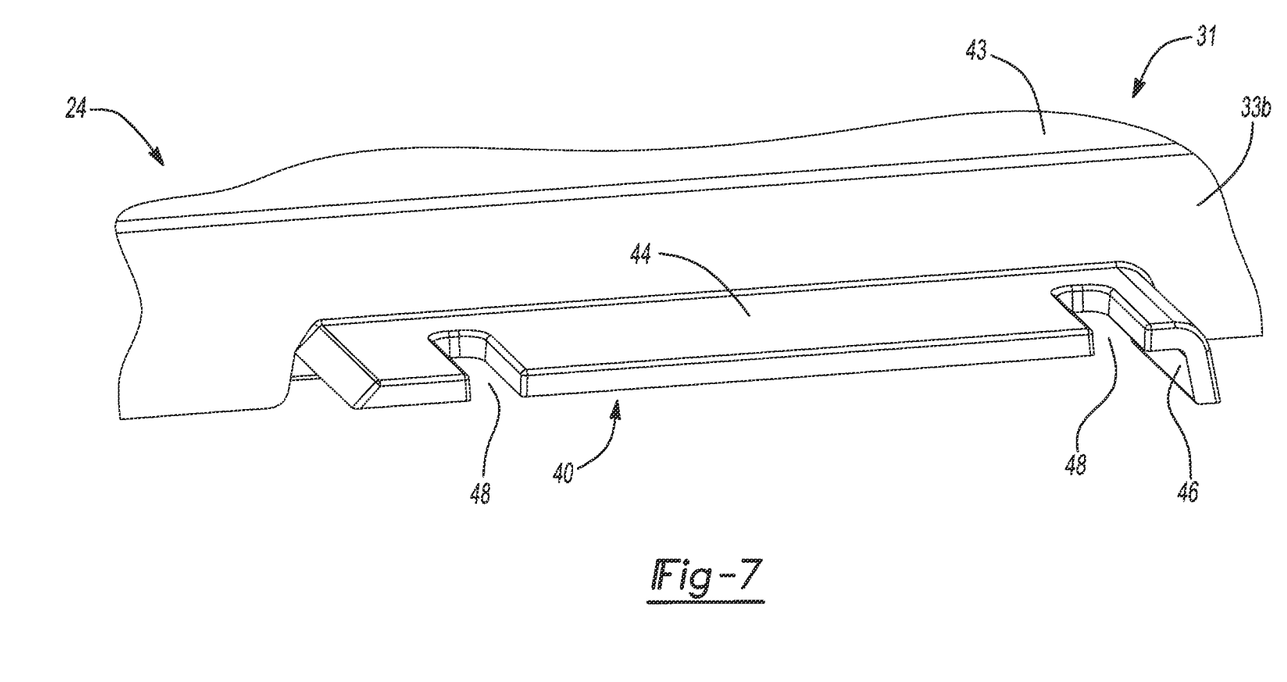
FIG. 7 is a perspective view of another locking member of the locking mechanism of the floor assembly.

Each pair of locking mechanisms 28 connects the floor panel 26 and the pair of trim panels 24 to prevent vertical and horizontal movement of the floor panel 26 when the floor panel 26 is fully disposed onto the surface 30 of the cargo area 17. Each pair of locking mechanisms 28 includes a left locking mechanism 28L and a right locking mechanism 28R. The left and right locking mechanisms 28L, 28R include one rectangular-shaped locking member or trim-panel locking member 40 and another rectangular-shaped locking member or floor-panel locking member 42 that cooperate to prevent movement of the section 34 of the floor panel 26 in the vertical direction and in the horizontal direction (toward the front end of the vehicle 10). The one locking member 40 is integrally attached to the inside side 33b of a respective trim panel 24 (below a top surface 43 of the main body 31) and is made out of a polymeric material. In some configurations, the one locking member 40 can be attached to the inside side 33b of the respective trim panel 24 via fasteners (not shown). The one locking member 40 includes a body 44 and a flange 46. The body 44 includes U-shaped slots 48 formed therein. Each slot 48 is formed at or near a respective end of the body 44 and extends laterally across the body 44. As shown in FIGS. 5 and 7, the flange 46 extends substantially perpendicularly from a rear end of the body 44 (the rear end of the body 44 extending toward the front end of the vehicle 10) toward the surface 30.

The another locking member 42 is attached to a bottom side 53 of the section 34 at a periphery thereof and is made out of a polymeric material. The another locking member 42 includes an attachment portion 54 and an interlocking portion 58. The attachment portion 54 includes a thickness that is greater than a thickness of the interlocking portion 58. The attachment portion 54 includes apertures 60 and locators 61. Fasteners 62 (e.g., bolts) extend through the apertures 60 of the attachment portion 54 and apertures (not shown) of the section 34, thereby coupling the attachment portion 54 and the section 34 of the floor panel 26 to each other. The locators 61 facilitate alignment and attachment of the another locking member 42 to the section 34.

Figure 6:
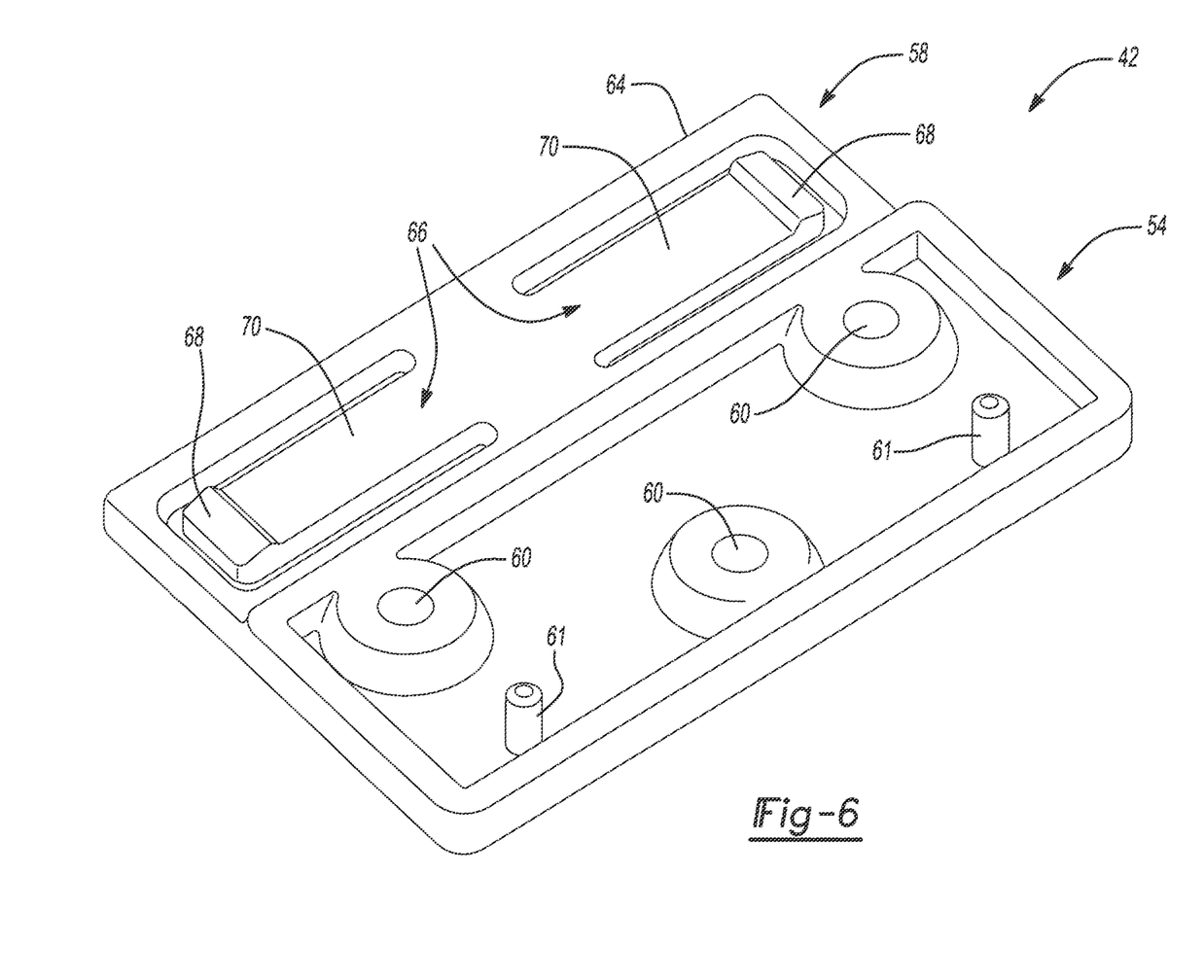
FIG. 6 is a perspective view of a locking member of a locking mechanism of the floor assembly.

As shown in FIG. 6, the interlocking portion 58 includes a body 64 and flexible spring elements 66. The flexible spring elements 66 are cantilevered from a middle portion of the body 64 and extend away from each other toward respective ends of the body 64. Each flexible spring element 66 includes a protrusion 68 at a distal end thereof. The protrusion 68 protrudes from a side 70 of the spring element 66. When the floor panel 26 is fully disposed onto the surface 30 of the cargo area 17, the protrusion 68 is received in a respective slot 48 of the one locking member 40 and the body 64 contacts the body 44 and the flange 46 of the one locking member 40 (FIG. 8), thereby preventing the section 34 of the floor panel 26 from moving in the vertical direction and in the horizontal direction (toward the front end of the vehicle 10).

Figure 8:
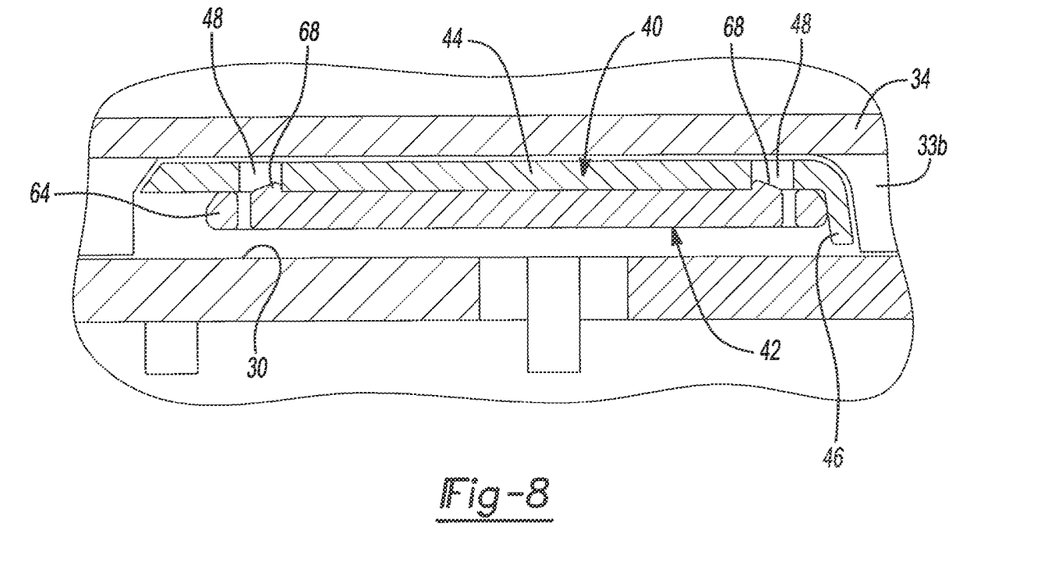
FIG. 8 is a partial cross-sectional view of the floor assembly in a secure state.

With continued reference to FIGS. 1-9, slidably disposing and removing the floor panel 26 into and out of the cargo area 17 will be described in detail. A user (not shown) may want to prevent access to the storage compartment 19 of the cargo area 17, and therefore, slidably disposes the floor panel 26 onto the surface 30 such that the protrusion 68 of each flexible spring element 66 is received in a respective slot 48 of the one locking member 40 and the body 64 of the interlocking portion 58 contacts the body 44 and the flange 46 of the one locking member 40 (FIG. 8). Thus, the section 34 of the floor panel 26 is prevented from moving in the vertical direction and in the horizontal direction (toward the front end of the vehicle 10). The gate 16 of the vehicle 10 is then rotated to the closed position (FIG. 9) such that the gate 16 restricts the floor panel 26 from moving in the vertical direction (i.e., the section 32 of the floor panel 26 is restricted from moving in the vertical direction) and in the horizontal direction (away from the front end of the vehicle 10). In this way, the floor panel 26 is in a secure state and access to the storage compartment 19 is prevented when the roof cover 14 is attached to or detached from the vehicle body 12. It should be understood that the section 32 of the floor panel 26 covers the storage compartment 19 when the floor panel 26 is in the secure state.

The user (not shown) may want to access the storage compartment 19 of the cargo area 17 to remove a spare tire disposed within, for example. To access the storage compartment 19 of the cargo area 17, the user first opens the gate 16 of the vehicle 10 to the open position. The user then rotates the section 32 of the floor panel 26 upwardly (FIG. 3) such that the storage compartment 19 of the cargo area 17 is accessible. It should be understood that when the gate 16 of the vehicle 10 is rotated to the open position, the floor panel 26 is in an unsecure state and can be slidably removed from the cargo area 17.

One of the benefits of the floor assembly 18 of the present disclosure is that the floor assembly 18 and the gate 16 cooperate to prevent access to the storage compartment 19 whether or not the roof cover 14 is attached to or detached from the vehicle body 12. This allows for safely storing items (e.g., a spare tire) in the storage compartment 19 while the roof cover 14 is detached from the vehicle body 12 and the user is away from the vehicle 10, for example. Another benefit of the floor assembly 18 of the present disclosure is that the pairs of locking mechanisms 28 are hidden from view when the floor panel 26 is in the secure state, thus avoiding interfering therewith when the vehicle roof cover 14 is attached to or detached from the vehicle body 12.

What is claimed is:

1. A vehicle comprising:
a cargo area having a surface; and
a floor assembly including a pair of elongated trim panels, a floor panel and a pair of locking mechanisms, the pair of elongated trim panels mounted to and extending along the surface of the cargo area at opposite sides thereof, the floor panel slidably disposed onto the surface of the cargo area and between the pair of trim panels, the pair of locking mechanisms connecting the floor panel and the pair of trim panels to prevent vertical and horizontal movement of the floor panel when the floor panel is fully disposed onto the surface of the cargo area,
wherein each locking mechanism includes a trim-panel locking member and a floor-panel locking member, the trim-panel locking member is attached to a respective trim panel and the floor-panel locking member is attached to a periphery of the floor panel,
wherein the trim-panel locking member includes a body and a flange, the flange extends from a periphery of the body toward the surface of the cargo area.

2. The vehicle of claim 1, wherein the floor-panel locking member slides under the trim-panel locking member when the floor panel is slidably disposed onto the surface of the cargo area.

3. The vehicle of claim 2, wherein the surface of the cargo area defines a storage compartment.

4. The vehicle of claim 3, wherein the floor panel includes a locking-member section and a handle section, and wherein the handle section is rotatably attached to the locking-member section.

5. The vehicle of claim 4, wherein the handle section of the floor panel covers the storage compartment when the floor panel is fully disposed onto the surface of the cargo area.

6. The vehicle of claim 5, wherein the floor-panel locking member is attached to the locking-member section of the floor panel.

7. The vehicle of claim 1, wherein the floor-panel locking member includes a body and at least one spring element, and wherein the at least one spring element is cantilevered to the body.

8. The vehicle of claim 7, wherein a protrusion extends from a distal end of the at least one spring element.

9. The vehicle of claim 1, wherein the body of the trim-panel locking member includes at least one slot formed therein.

10. The vehicle of claim 9, wherein the protrusion extending from the distal end of the at least one spring element is received in the at least one slot formed in the body of the trim-panel locking member when the floor panel is fully disposed onto the surface of the cargo area.

11. The vehicle of claim 10, wherein the body of the floor-panel locking member contacts the flange of the trim-panel locking member to restrict horizontal movement of the floor panel when the floor panel is fully disposed onto the surface of the cargo area.

12. The vehicle of claim 11, wherein the body of the floor-panel locking member contacts the body of the trim-panel locking member to restrict vertical movement of the floor panel when the floor panel is fully disposed onto the surface of the cargo area.

13. The vehicle of claim 2, further comprising a gate rotatable between a closed position and an open position, the gate restricting vertical and horizontal movement of the floor panel when in the closed position.

14. A vehicle comprising:
a cargo area having a surface; and
a floor assembly including a pair of elongated trim panels, a floor panel, and a pair of locking mechanisms, the pair of elongated trim panels mounted to and extending along the surface of the cargo area at opposite sides thereof, and the floor panel slidably disposed onto the surface of the cargo area and between the pair of trim panels,
wherein each locking mechanism includes a trim-panel locking member and a floor-panel locking member, the trim panel locking member being attached to a respective trim panel and the floor-panel locking member being attached to a periphery of the floor panel,
the trim-panel locking member includes a body having at least one slot formed therein, and a flange that extends from a periphery of the body toward the surface of the cargo area,
the floor-panel locking member includes a body having at least one spring element that includes a protrusion extending from a distal end thereof, the protrusion being configured to be received within the slot of the trim-panel locking member when the floor panel is fully slidably disposed onto the surface of the cargo area to restrict vertical and horizontal movement of the floor panel, and
the body of the floor-panel locking member contacts the flange of the trim-panel locking member to restrict horizontal movement of the floor panel when the floor panel is fully slidably disposed onto the surface of the cargo area.

* * * * *